J. B. MELDRUM.
Eveners for Threads.

No. 140,215. Patented June 24, 1873.

Witnesses:
A. W. Almqvist
O. Sedgwick

Inventor:
J. B. Meldrum
Per
Attorneys.

UNITED STATES PATENT OFFICE.

JOHN B. MELDRUM, OF PATERSON, NEW JERSEY, ASSIGNOR TO THE BARBOUR FLAX-SPINNING COMPANY, OF SAME PLACE.

IMPROVEMENT IN EVENERS FOR THREAD.

Specification forming part of Letters Patent No. 140,215, dated June 24, 1873; application filed March 29, 1873.

*To all whom it may concern:*

Figure 1:
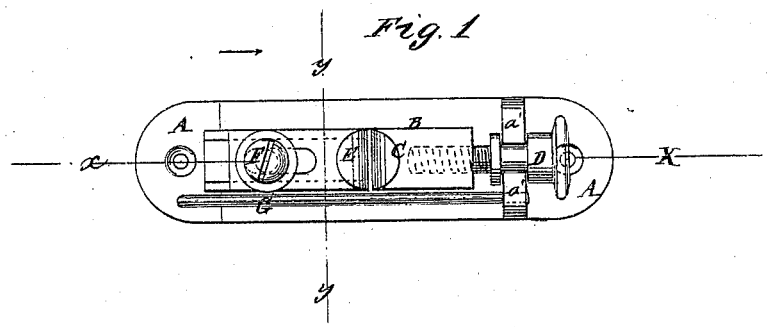
Figure 2:
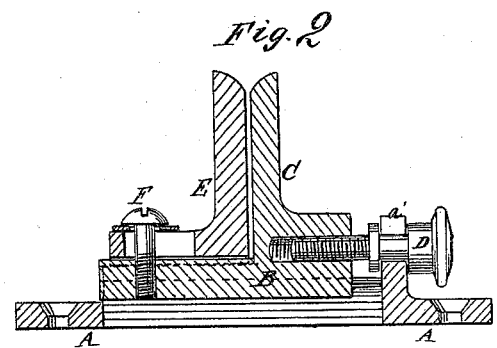
Figure 3:
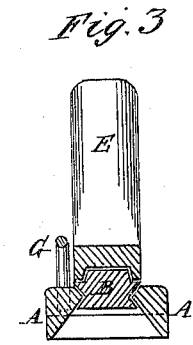

Be it known that I, JOHN B. MELDRUM, of Paterson, in the county of Passaic and State of New Jersey, have invented a new and useful Improvement in Evener for Sewing-Machine Shoe-Thread, of which the following is a specification:

Figure 1 is a top view of my improved device; Fig. 2 is a longitudinal section of the same taken through the line $x\ x$, Fig. 1; Fig. 3 is a cross-section of the same taken through the line $y\ y$, Fig. 1.

Similar letters of reference indicate corresponding parts.

My invention is an improvement in the class of thread-eveners formed of vertical jaws adjustable toward or from each other; and the improvement consists in adapting the jaws to be adjusted independently and also simultaneously, as occasion may require. A is the base-plate of the device, which is designed to be secured to some suitable support. The middle part of the plate A is slotted, and its sides project upward a little, and are adapted to enter grooves formed in the side edges of the plate B, and serve as a way for said plate B to slide upon. Upon the end part of the plate B is formed an upright arm or jaw, C, in the base of which is formed a screw-hole to receive the screw D, which is sustained by a lug, $a'$, formed upon the plate A near one end, so that, by turning the screw D, the plate B may be moved back and forth as may be required. E is the movable or adjustable jaw or arm, the base of which is extended outward, and is slotted to receive the screw F, by which the said jaw E is secured to the plate B, so that, by loosening the screw F, the jaws C and E may be adjusted at such a distance apart as the thickness of the thread or strand may require. The adjacent faces of the jaws C E are made perfectly smooth and true, and their upper ends are beveled off toward each other to form a notch for convenience in inserting the thread. By this construction the screw F enables the jaws to be adjusted at such a distance apart as the thickness of the thread may require; and the screw D enables the two jaws C E to be moved together in one or the other direction to bring the jaws C E directly in line with the thread. G is is a guard-wire attached to the base-plate A, to keep the thread from cutting the base-plate A.

Having thus described my invention, I claim as new, and desire to secure by Letters Patent—

The jaw C, provided with the extended base B, the supplementary jaw E adapted to slide on said base and be secured thereto by a slot and set-screw, when combined with the plate A by lug and screw, as shown and described, and for the purpose specified.

JOHN B. MELDRUM.

Witnesses:
JAMES H. ROGERS,
PETER RYLE.